United States Patent [19]
Thorud et al.

[11] 3,750,378
[45] Aug. 7, 1973

[54] ROTARY MOWER WITH SAFETY DISCHARGE

[75] Inventors: Richard A. Thorud; Kenneth N. Hasenbank, both of Minneapolis, Minn.

[73] Assignee: Toro Manufacturing Corporation, Minneapolis, Minn.

[22] Filed: Aug. 27, 1971

[21] Appl. No.: 175,441

[52] U.S. Cl. .................. 56/10.5, 56/17.4, 56/320.2
[51] Int. Cl. ............................................ A01d 35/26
[58] Field of Search ............... 56/10.5, 17.4, 17.5, 56/320.1, 320.2, 202, 255, 17.1, 13.4

[56] References Cited
UNITED STATES PATENTS

| 3,648,445 | 3/1972 | Efflandt | 56/320.2 |
| 3,453,812 | 7/1969 | Heidner et al. | 56/320.2 |
| 2,807,126 | 9/1957 | Bennett | 56/320.2 X |
| 2,708,334 | 5/1955 | Coners | 56/320.2 |
| 3,132,457 | 5/1964 | Slemmons | 56/202 |
| 3,568,421 | 3/1971 | Smith et al. | 56/17.4 X |
| 3,014,330 | 12/1961 | Oberdick | 56/17.5 X |
| 3,541,771 | 11/1970 | Schulze | 56/320.2 X |
| 3,378,995 | 4/1968 | Welsh | 56/320.1 |
| 3,212,244 | 10/1965 | Wilgus | 56/17.1 |
| 2,973,613 | 3/1961 | Hagedorn | 56/255 UX |

Primary Examiner—Russell R. Kinsey
Assistant Examiner—J. N. Eskovitz
Attorney—Vernon A. Johnson et al.

[57] ABSTRACT

A side discharge rotary mower having a baffle across the lateral discharge mouth of the housing. A deflector overlies and encloses the top and sides of the discharge opening of the housing and the aforementioned baffle and extends laterally outwardly from the housing and the discharge opening. The top of the deflector includes a discharge opening with a hinged spring loaded cover or door therefor, which cover is cooperatively related to a switch. The opening in the deflector is designed for use with a lift-out bag chute to permit optional bagging of the clippings where desired. The switch, which is actuated by the cover and bag chute, is designed to permit the engine to operate whenever the cover is closed or the bag chute is properly installed in the deflector, but is further designed to short and shut off the motor when the cover is raised and the bag chute is not installed therein. The rear half of the housing is provided with a curved, generally horizontal, underguard which under-lies the path of travel of the outer cutting portion of the blade in the rear half of the mower. A smaller underskirt in the left front quadrant prevents blow-out, and a curved depending wall on the top of the deflector disperses the clippings before they leave the deflector and are scattered on the ground. An improved rear safety shield is hinged to the rear of the housing and freely rides on the turf behind the mower. A shroud hingedly mounted on the engine and held in place by the gas cap overlies and protects the engine, carburetor, gas tank, muffler and ignition system.

5 Claims, 39 Drawing Figures

PATENTED AUG 7 1973 3,750,378

INVENTORS
RICHARD A. THORUD
KENNETH N. HASENBANK
BY THOMAS A. LENNON
ATTORNEY

INVENTORS
RICHARD A. THORUD
KENNETH N. HASENBANK
BY THOMAS A. LENNON
ATTORNEY

INVENTORS
RICHARD A. THORUD
KENNETH N. HASENBANK
BY THOMAS A. LENNON
ATTORNEY

ROTARY MOWER WITH SAFETY DISCHARGE

Rotary mowers have become the most popular means for cutting the lawns of the average homeowner, since such mowers are relatively inexpensive, easy to maintain, and are capable of effectively operating in all kinds of grass conditions. However, because they involve the use of a horizontal cutting blade necessarily operating at high speeds of rotation, the possibility of injury occurring from contact with the blade or from being struck by an object thrown by the blade always exists. Therefore, it is an important object of this invention to provide a mower which is safer in design than has heretobefore been available, and which minimizes the chances of a person's body coming in contact with the blade, or of being struck with an object encountered and thrown by the blade.

The average rotary mower is designed so as to give the customer the option of either bagging the clippings, or of permitting them to be scattered directly back onto the grass. It is, therefore, an important object of this invention to provide an improved discharge system which, when the bag or collecting means is not connected therewith, will require every thrown object leaving the housing through the discharge opening to encounter a surface of the baffle or deflector which will absorb at least some of its energy and change the direction thereof and deflect the thrown object downwardly against the ground.

Another object is to design a discharge system for use with a collection bag for the clippings, in which any objects thrown by the blade in a laterally or upwardly direction from the discharge opening must, of necessity, change direction at least once and preferably oftener so as to reduce the velocity thereof, in combination with a bag capable of confining all such objects within said bag.

Still another object is to provide a safety switch in conjunction with the discharge system and bag chute which operates to automatically stop the engine and therewith the rotation of the blade whenever the bag chute is disengaged from the discharge chute of the housing or whenever the cover for the chute opening is raised and the deflector interior is exposed from the top.

Still another object is to provide a housing provided with a novel rear safety shield to protect the operator's feet from contact with the blade and the operator himself from being struck by thrown objects.

A further object is to provide a rear underskirt to protect the operator's feet from contact with the blade and to minimize escape and recirculation of clippings, and to further prevent blowout or escape of clippings from the left front quadrant by the use of an additional underskirt in that area.

Still another object is to protect the engine and its peripheral component by a unique shroud which is held in place by the gas tank cap.

These and other objects and advantages will become apparent from the description made in connection with the accompanying drawings wherein the character references refer to the same parts throughout the several views, and in which:

FIG. 31 is a side elevational view of an alternate form of cover clip.

Figure 1:
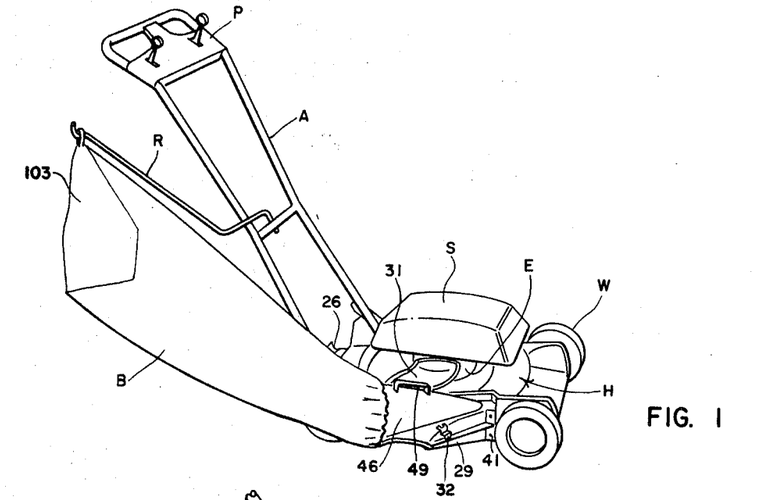
FIG. 1 is a perspective view of a rotary mower embodying one preferred version of this invention.
Figure 2:
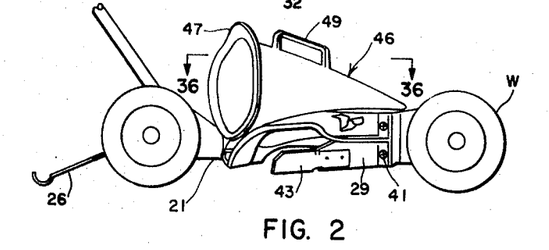
FIG. 2 is a side elevational view of a portion of said rotary mower, showing the deflector and bag chute.

Referring to the drawings for a more detailed description of the invention involved herein, FIG. 1 illustrates a complete rotary mower embodying one preferred form of this invention. The illustrated mower includes a housing H supported by four ground wheels W, the housing enclosing a horizontal rotary cutting blade, (seen in other Figures) which is driven by an engine E mounted on top of said housing, said engine being enclosed and covered by a shroud S, the unit being steered by a handle assembly A attached and extending upwardly and rearwardly from said housing H and having a control panel P. A bag B is provided to collect the clippings, the rear of said bag being supported by a rod R attached to the handle assembly. The forward end of the bag is connected to a bag chute 46 which in turn is mounted on a deflector 29, said chute and deflector being portions of the inventions described in more detail hereinafter.

The housing H includes a top deck 20 having a depending circular outer skirt 21 about substantially the entire periphery thereof, which completely encloses the cutting blade except for the discharge opening 23 with the top deck and the skirt being used in part to provide an inverted volute channel 22 which faces downwardly and progressively increases in size, which channel collects the clippings and delivers them to the discharge opening 23 on the right side of the mower. Said channel encompasses virtually the entire periphery of the housing, and originates at the right side of the right rear quadrant of the housing, and then extends across the rear, around the left side, and across the front, terminating at the discharge opening on the right side of the mower, at which point the channel has its largest cross-sectional size, the channel being oriented to discharge the clippings in a laterally and rearwardly direction at approximately a 45 degree angle from the transverse centerline of the housing. The top deck supports the engine E. The housing H also includes a forwardly projecting portion 24 on which the front ground wheels are mounted, the front projection 24 also serving as a safety feature in that it tends to intercept any objects thrown forwardly from underneath the housing by the rotating cutter, and also serves to prevent inadvertent insertion of a person's foot beneath the mower housing where it might be injured if the blade were rotating. The rear end of the mower includes a rearwardly extending projection 25 on which the rear ground wheels are mounted and to which a rear safety shield 26 is pivotally attached for riding on the ground and serving to minimize and prevent insertion of the operator's foot beneath the housing from the rear. This shield 26 also serves to intercept any objects thrown rearwardly from underneath the housing H, and thereby potects the operator from thrown objects when he is in normal operating position behind the handle assembly A. This shield 26 is also of unique construction and design which will be commented on in more detail hereinafter. A rotary cutting blade 27 is driven by the engine and operates within said housing H, and rotates in a generally horizontal plane.

Figure 3:
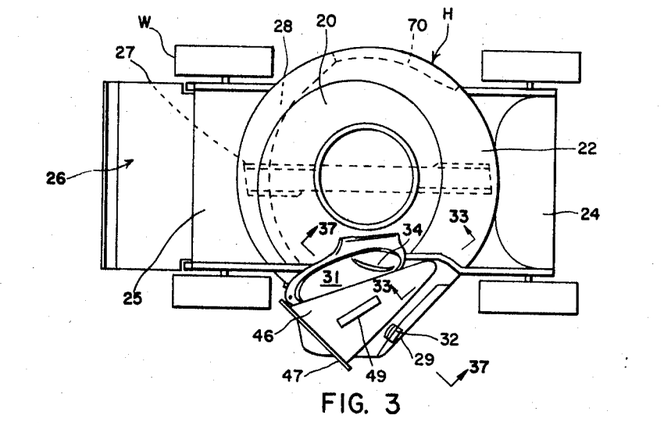
FIG. 3 is a top plan view of the housing of FIG. 2 with the deflector and bag chute attached, and shroud and engine removed.
Figures 4, 5, 23, 24, 25:
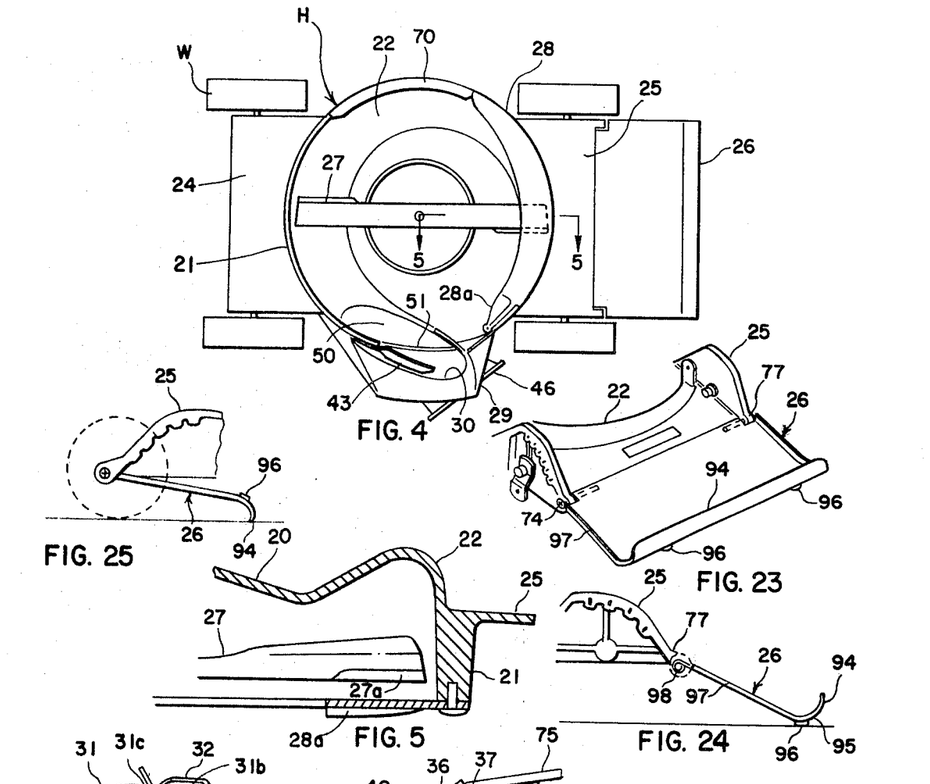
FIG. 4 is a bottom plan view of the housing of FIG. 3.
FIG. 5 is an enlarged sectional view taken along the line 5—5 of FIG. 4.
FIG. 23 is a rear perspective view showing the rear safety shield attached to the housing.
FIG. 24 is a side elevational view of FIG. 23.
FIG. 25 is a somewhat schematic side elevational view showing the rear safety shield folded under the mower.
Figures 6, 38, 39:
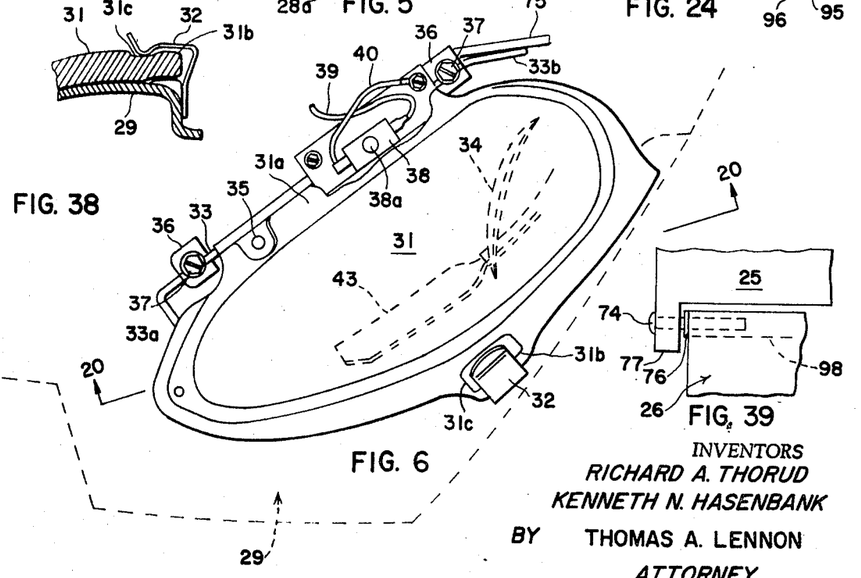
FIG. 6 is a detailed view in top plan on an enlarged scale of the deflector with the cover closed.
FIG. 38 is a detail view in vertical cross-section on an enlarged scale showing the cover held in closed position on the deflector by the clip.
FIG. 39 is an enlarged detail view showing the rear safety shield mounted to the housing.

As an additional safety feature, an underskirt 28 is provided on the underside of the housing as best seen in FIGS. 3, 4, and 5. This underskirt is generally semi-circular when viewed from above or below, and extends approximately 180° from one side to the other of the housing, so as to essentially extend the entire rear periphery of the housing. The underskirt is preferably of a thickness or width which corresponds with the length of the actual cutting edge portion of the cutting blade so that if a hand or foot inadvertently gets beneath the housing in the rear thereof, it is impossible for it to physically come in contact with the cutting edge of the blade. Operational conditions and design parameters may not permit the underskirt to cover the entire cutting edge, but it will still cover a substantial portion of the outer end portion of the cutting portion of the blade and minimize injury therefrom.

The underskirt, of course, underlies and extends below the plane of rotation of the cutting blade 27. This underskirt also has the advantage that it assists in preventing objects from being thrown randomly rearwardly from underneath the housing, assists in containing objects within the housing, and also, from the functional standpoint, it improves the efficiency of the air movement within the housing by trapping more of the air generated by the rotating blade and collects same and directs it along the channel 22 to minimize recirculation and improve the bagging aspects of the mower, and effects the air pressure in the channel.

Figures 10, 11, 15, 16, 17, 18, 21, 22, 30:
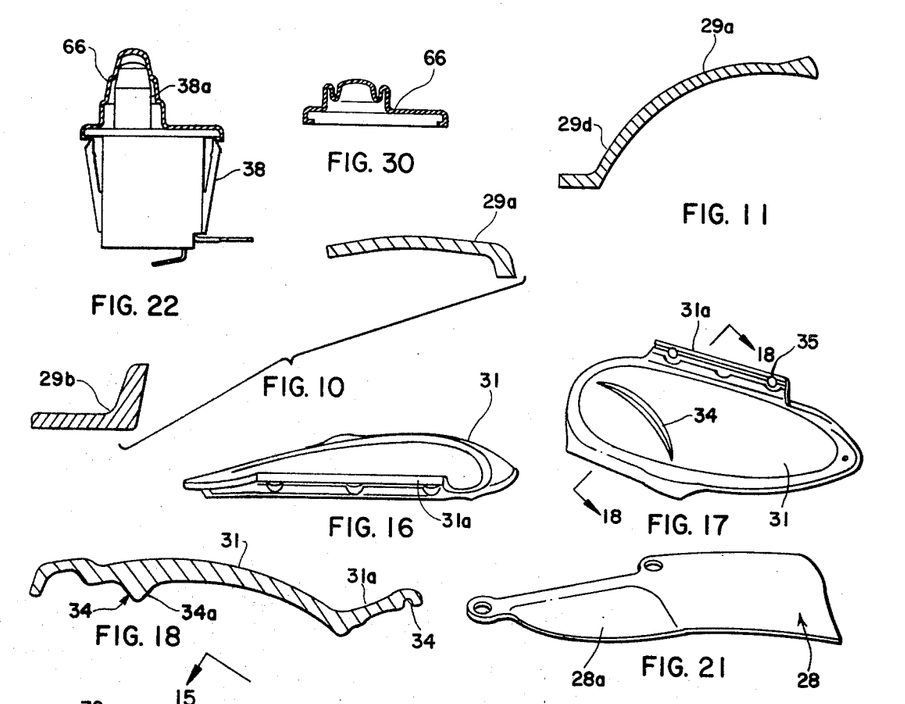
FIG. 10 is a cross-sectional view taken along the lines 10—10 of FIG. 9.
FIG. 11 is a partial cross-sectional view of the deflector taken along the lines 11—11 of FIG. 9.
FIG. 15 is an outer elevational view of the clip of FIG. 12 looking in the direction of arrows 15—15.
FIG. 16 is a perspective view of the cover by itself.
FIG. 17 is a bottom plan view of the cover.
FIG. 18 is a cross-sectional view of the cover taken along the line 18—18 of FIG. 17.
FIG. 21 is an enlarged detailed view of the ramped end portion of the underskirt.
FIG. 22 is a cross-sectional view of the switch with its protective boot.
FIG. 30 is a sectional view of the switch boot in its natural condition.

As best seen in FIG. 21, the right end portion of the underskirt has a depressed inclined ramp portion 28a which lies below the plane of the remainder of the underskirt and slopes generally forwardly and downwardly and to the right from the main body portion of the underskirt to assure that the cutting blade operates above, rather than below, the underskirt. The blade rotates clockwise (as viewed from above) so that the guide ramp 28a is located at the approach end of the underskirt, and is deemed desirable since the blade will occasionally flutter or vibrate during use.

In the left front quadrant of the housing a second and smaller underguard or underskirt 70 is provided. This guard prevents blowout of the clippings from underneath the housing in this area, and also serves to protect the hands and feet of the operator and bystanders, as does the underskirt 28, since it underlies the path of travel of the cutting edge of the blade.

The mower of this invention is designed to give the operator the option of either bagging the clippings or permitting them to be discharged and scattered back onto the lawn, but with both the bagging and the scattering taking place under controlled conditions providing the maximum of safety.

To provide this dual function in the safest manner possible, an inverted channel or U-shaped deflector 29 is provided which is mounted on the housing H and extends laterally and rearwardly therefrom, constituting an extension of the discharge opening and channel 22 and designed to intercept all material, whether clippings or foreign objects, discharged from the mower through the discharge opening 23.

The deflector 29 is an elongate member with the length being generally oriented in the direction of discharge of the material from the housing. The deflector has a large top opening 30, for which opening a pivotally mounted loaded cover 31 is provided, which cover is retained in closed position by a clip 32 mounted on the outer upper front portion of the deflector housing.

Figures 7, 8, 9, 32, 33:
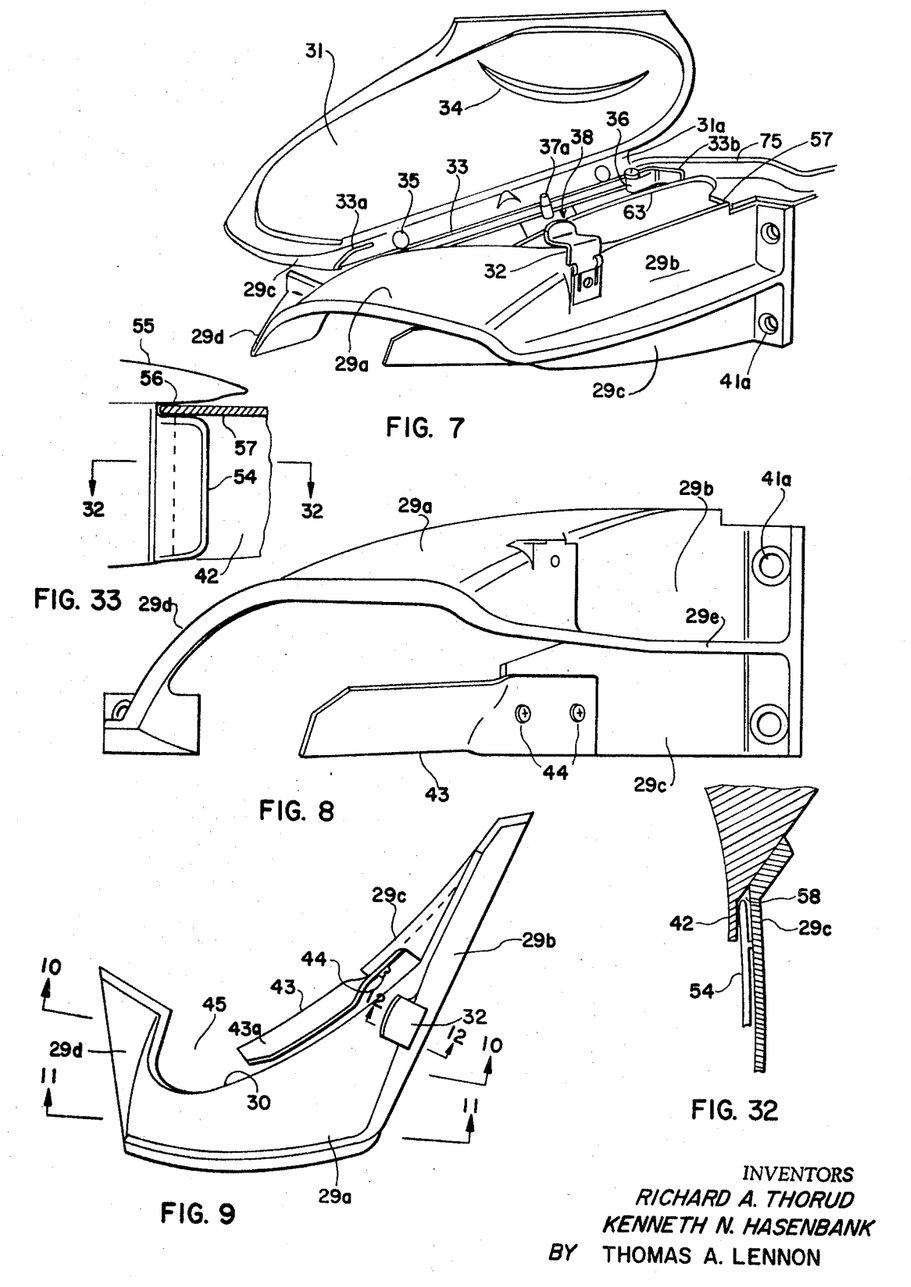
FIG. 7 is a detailed perspective view on an enlarged scale of the deflector with the cover raised and without the bag chute being installed therein.
FIG. 8 is a detailed end elevational view of the deflector on an enlarged scale, with the cover removed.
FIG. 9 is a top plan view on an enlarged scale of the deflector with the cover removed to reveal the baffle.
FIG. 32 is a horizontal sectional view taken approximately along the line 32—32 of FIG. 33.
FIG. 33 is a vertical sectional view taken approximately along the line 33—33 of FIG. 3.

The cover is pivotally attached to the housing H by means of a spring rod 33 which is seated in a recess or channel formed in the rear inwardly extending cover portion 31a; the rod 33 being secured to the cover by rivet fasteners 35, as best seen in FIG. 7, which permit the cover to turn freely relative to the rod. Thus, the cover pivots or turns about the spring rod 33. The outer ends of the rod are seated in channels in mounting bosses 36 formed on the blade housing and are rigidly secured to the bosses by fasteners 37.

One end 33a of the spring is formed in the shape of a rectangular loop against which the cover acts when it is closed, the loop 33a continuously biasing the cover towards open position when the cover is closed. The other end 33b of the spring is offset and extends downwardly along and in engagement with a wall 75 of the housing to resist the torque on the rod and prevent said rod from turning when the cover engages the end 33a.

Thus, the cover is biased towards open position because the switch button 38a of switch 38 is biased upwardly towards switch closing, engine stopping position, the opening of the cover stopping the engine and preventing starting thereof unless the cover is closed or the bag chute is properly installed in a manner hereinafter described. However, it will be understood that other types of switches can be used, and it may, in some circumstances, be more desirable to bias the cover towards closed position, rather than open.

This spring action on the cover is not only a convenience feature which automatically brings the cover to a fully open and upright position when it is released from clip 32, but also is important from a safety standpoint. The switch does not close the instant the cover is released from the clip. Rather, the cover must swing upwardly a substantial distance before the switch is released sufficiently to close and stop the motor. Until this happens, the motor continues to run and the blade continues to rotate, thereby creating the possibility of objects being thrown upwardly through the partially uncovered opening 30, to the possible detriment of the operator or bystanders.

The underside of the cover is provided with a depending curved rib 34 which is interposed in the path of the entrained grass when the cover is closed. The air flow and the grass entrained therein have a natural tendency to follow the upper wall or roof of the channel and deflector. The rib 34 serves as a "spoiler" and shatters the main stream of discharged grass, deflecting it into a broad spray and fanning and scattering same on the lawn, thereby improving the dispersion characteristics and enhancing the ability of the clippings to settle between the standing blades of grass so that they cannot be seen after the lawn is cut, thereby improving the appearance of the cut lawn and minimizing, and in some cases eliminating windrowing all together. However, the rib does not interfere with bagging as the cover is open during the bagging operation, and the rib is not in the path of the grass moving from the housing into the bag.

The rib is V-shaped in cross section with the apex pointed downwardly so that the inner inclined surface 34a thereof deflects the clippings which impinge thereagainst downwardly while spreading out the more concentrated stream of clippings initially emerging from the discharge opening 23 into a wider fan shaped pattern.

To avoid injury when the cover is open and the bag chute hereinafter to be described is not installed therein, switch 38 is mounted on the mower housing beneath the inner or rear portion of the cover. The switch has a pair of leads 39 and 40 which go to the housing and the engine respectively, and the switch includes an operating button 38a which is normally spring biased upwardly towards a switch closing position, the switch when closed shorting out the motor so that it cannot run. Thus, when the button is raised, the motor cannot be started, and if already in operation, immediately stops.

The cover portion 31a constitutes an integral part of the cover, and also serves to operate the switch which portion almost immediately engages and depresses the button 38a when the cover is closed, and moves almost immediately out of engagement therewith as soon as the cover begins to be opened. Thus, the motor is shut off before the cover is actually completely open.

To prevent the switch from becoming plugged with grass or dirt, or becoming filled with water and thereby being rendered inoperative, a boot 66 may be provided, as illustrated in FIG. 22. This boot is formed of flexible material, such as rubber, neoprene or hycar elastomers, and completely shields the switch from the clippings and other material being discharged from the blade housing. However, because of the boots' flexibility, it does not interfere with the normal operation of the switch.

Referring to the switch, the lead 40 (the ground wire) may be eliminated by grounding the switch body itself.

The deflector assembly includes a top wall 29a, and an upper front wall 29b and a lower front wall 29c, and a rear wall 29d, so that the deflector assembly in essence is an inverted channel shaped chute in cross section. The lower marginal edges of walls 29c and 29d are coextensive and co-planar with the lower marginal edge of the side skirt 21 of the blade housing, and the upper and lower front wall portions are joined together by a horizontal forwardly extending flange portion 29e.

The lower front wall 29c is set inwardly somewhat from the upper front wall 29b, the lower wall 29c serving as a portion of the baffle structure which lies in a vertical plane which intersects the plane of the cutting blade and intercepts objects thrown by the blade.

The outer end portion of the deflector (as viewed from above) bends slightly forwardly, forcing the clippings to change direction, and have a more lateral discharge when the clippings are allowed to be scattered back on the lawn.

The interior surfaces of the deflector are designed so that anything striking it is guided into a downward angle such that it will strike the ground within a short distance from the mower. The deflector may be lined with or made from an impact-absorbent material, which has a slick enough surface to allow free passage of light material such as grass or leaves, but which absorbs the energy of a heavy-mass object such as a stone or wire. Such objects would then leave the mower at greatly reduced velocities, thus minimizing the chance of inflicting injury or damage. Appropriate parts of the housing channel 22 may also be lined with such material, to further absorb energy of thrown objects.

The particular deflector illustrated is designed to be fastened to the housing by fasteners 41 installed in openings 41a in the deflector at both the rear and the front of the deflector. However, it will be understood that the deflector can be integrally cast as an integral part of the housing.

The front wall of the channel 22 terminates at the discharge opening 23 in a vertical outwardly extending flange or wall portion 42, which is spaced slightly from the inner or rear face of front wall 29c to form or define therewith a vertical slot or chamber therebetween for the reception of the front end of the bag chute in a manner described in more detail hereinafter.

The curved inner face of the lower front wall 29c in effect constitutes an extension of the front interior wall of the housing and the channel 22. Attached to this extension is a baffle bar 43 which is removably secured to the front wall 29c by means of screw fasteners 44. Athough the baffle bar is shown as being separately fastened to the deflector body, it is to be understood that it too can be formed as an integral part of the deflector housing, which is in turn attached to the blade housing or it can be cast as a part of the housing itself. The baffle bar also constitutes, in essence, a further extension of the interior front wall of the housing and volute channel, with the baffle bar lying in the same plane as the plane of rotation of the cutter blade so that it completes the baffle structure started by wall 29c, and lies in a position to intercept objects thrown by the blade. The geometry of the baffle structure in combination with the deflector is such that a straight line perpendicular to the cutting edge of the blade cannot exit the mower through the discharge port. Or, to state it another way, there is no unobstructed straight line perpendicular to the cutting edge of the blade and the operator, or any bystander. Therefore, grass or any object struck and thrown by the blade must strike at least one surface (either a part of the mower or the ground) before it can emerge from the cutting compartment or the safety attachments attached thereto. If the objects are thrown on turf, they are further decelerated by the thick mat of grass. Because of this baffle structure provided by the wall surfaces of 29c and 43, substantially all the material being discharged from the housing through the discharge opening must rise over this baffle structure, otherwise it cannot escape therefrom.

Because of the baffle the material must necessarily strike some part of the deflector assembly after passing over or around baffle 43 and its supporting structure so that if the deflector cover is closed (which means the bag chute is not installed therein), all material discharged from the housing must ricochet off the deflector assembly and back downwardly onto the ground. It will be observed that a slot or space 45 exists between the baffle 43 and the rear wall of the deflector. The purpose of this slot is to prevent hang-up of the clippings and build-up of the clippings in this rear corner during operation. However, it is to be clearly understood that a mower having a baffle such as 43 extending entirely across the bottom of the discharge opening so as to completely span the front and rear portions of the housing which defines the discharge opening, and thus completely span the discharge opening, is within the scope and concept of this invention. Thus, because of the baffle 43, foreign objects struck by the rotating cutting blade cannot emerge from the housing directly laterally since they will necessarily encounter the baffle or deflector and either be deflected backwardly into the housing or will ricochet off the deflector and down onto the ground with little or no harm to bystanders since a large part of the particles' energy will have been absorbed and reduced after striking the ground. Also, the baffle bar 43 assists in preventing anyone's hand or foot from entering the housing through the discharge opening and encountering the rotating blade.

The free end portion 43a of the baffle is preferably twisted with respect to its mounting portion and is inclined upwardly and laterally outwardly (a 30° twist in one preferred form) to facilitate the safe movement of material out of the housing. However, said portion may be vertically oriented (upright) within the scope of this invention. The majority of the lighter weight grass clippings will be entrained in the air and generally will follow the top portion of the channel and deflectors as it moves through and out of the housing, without striking the baffle. Since the deflector is inclined laterally downwardly such material is naturally deflected downwardly towards the ground as it leaves the deflector. The baffle serves to intercept heavier objects such as stones, wire, glass, etc., and prevents their being thrown directly out of the housing in a manner which might cause injury or damage.

The discharge area is carefully shaped to minimize recirculation since each time an object is recirculated, the greater its chance of being randomly discharged from an uncontrolled area. The minimization of recirculation also improves the mowers efficiency, since any volume of grass which recirculates absorbs energy while doing so, and reduces the horsepower available for grass cutting. This overall design also reduces the need for the operator to dig grass out of the chute after overfilling the bag, and provides increased bagging performance. Part of this is attributable to increased air movement within the housing, especially the channel, which also results in a cleaner channel, minimizes clumping, fall through and blade bounce. This style also permits the use of a bag which rides higher off, and out of contact with, the ground, thereby reducing wear on the bag and increasing the life of the bag.

Following the USASI method of determining square degrees of discharge opening, this machine has zero square degrees of opening, which is important when one considers that USASI standards permit 1,000 square degrees.

To provide for collection of the clippings, a specially designed generally conically shaped tubular bag chute 46 is provided which is designed to convey material between the housing and the bag, and which has its apex located nearest the blade housing, the interior of said chute progressively increasing in size from its apex to its point of attachment with the bag. The rear portion of the bag chute has an annular lateral flange 47 to which the bag B is attached. A handle 49 is provided for convenience in manipulation of the bag chute. The front lower portion of the bag chute has an opening 50 for initially receiving the material being discharged from the mower housing H. The right side of this opening is defined by a curved depending wall or flange 51 which is insertable behind the baffle 43 and the front wall 29c of the deflector so as to intercept all material being discharged and also to facilitate proper location and installation of the chute in the deflector. This side wall 51 has an off-set rear extension 52 which, together with the wall 51, completely closes off the discharge opening of the deflector and requires all material being discharged from the housing to enter the chute. The left side of the chute (as viewed from above) has a laterally extending switch operating tab 53 which is designed to engage the button 38a of the switch and depress same when the chute is properly installed to permit operation of the engine, and at the same time is designed to immediately release the switch button and stop the motor as soon as the operator begins to remove the bag chute.

The bag chute is uniquely designed so as to automatically lock in place on the deflector. The front wall has a leading end portion 54 which terminates short of the leading end portion 55 of the top wall, forming therebetween a slot 56 which receives portion 57 of the housing, with chute portion 55 overlying and resting upon said housing portion 57.

The vertical wall portion 42 of the blade housing cooperates with the inner end of front wall 29c of the deflector to define a vertical slot 58 which receives leading portion 54 of the chute to hold and position the chute.

The rear extension of the front wall of the chute has an offset locking tab 48 which is resilient and when press fitted into the deflector deforms and tightly engages the wall portion defining the opening 30.

There is a slot 59 immediately above the tab 48, which receives a portion of the top wall of the deflector so that the chute cannot be removed if pulled directly rearwardly. However, it does not impede the removal of the chute when it is pulled directly upwardly.

The lower marginal edge 51a of the front chute wall 51 is of the same curvature as the interior wall of the blade housing, and is substantially in the same plane as the lower edge of the blade housing skirt, so that the skirt and chute form a substantially perfect circle, with the chute completely spanning the discharge opening.

In the illustrated form, the bag chute is formed of a single sheet of plastic material, and then the free ends thereof are fastened together by means of staples 60, or rivets.

A positioning rib 61 is provided against which the edge of depending wall portion 62 is placed during assembly, to facilitate accurate assembly and formation of the bag chute.

The left side of the chute which carries the tab 53 also is provided with an elongate laterally extending flange 62 which rests on the raised ledge portion 63 of the housing adjacent the switch to position the chute and prevent escape of clippings between the chute and the housing.

Thus, the chute is of the "lift out" type, and is readily installed and held in place and removed without having to manipulate any fasteners or other structure, and requires only a firm upward pull on the handle 49 to disengage it from the deflector, or conversely, a firm downward and forward push to install.

The cover clip 32 has a downwardly oriented offset portion or rib 32a adjacent the upper free end portion thereof which cooperates with an upstanding ridge or rib 31b formed in the top outer edge of the cover by a depression 31c in the cover.

The clip is held on the deflector by a retaining plate 64 formed of spring metal and which is secured to the deflector by a fastener 65. The upper part of the retainer has two arcuate portions 64a which are resilient and receive between them and a wear plate 69 interposed between the retainer and the deflector housing two laterally extending mounting pivot tabs 32b which turn relative to portions 64a to permit swinging movement of the clip between the solid line locking position and the broken line unlocked position of FIG. 12.

The clip is held in its respective positions by what might be termed an "over-center" action on the part of the portions 64a. When the pivot tabs 32b move past the bight portion or corners of 64a, the spring action thereof forces the tabs and clip to continue in the direction of movement and biases it to the desired position. The upper free end portion 32c of the clip serves as a handle for manually manipulating the clip. The clip when swung to the open broken line position of FIG. 12 is held in such out of the way position by the spring retainer 64 when the bag chute is installed, so as not to interfere therewith.

Figures 12, 19, 20:
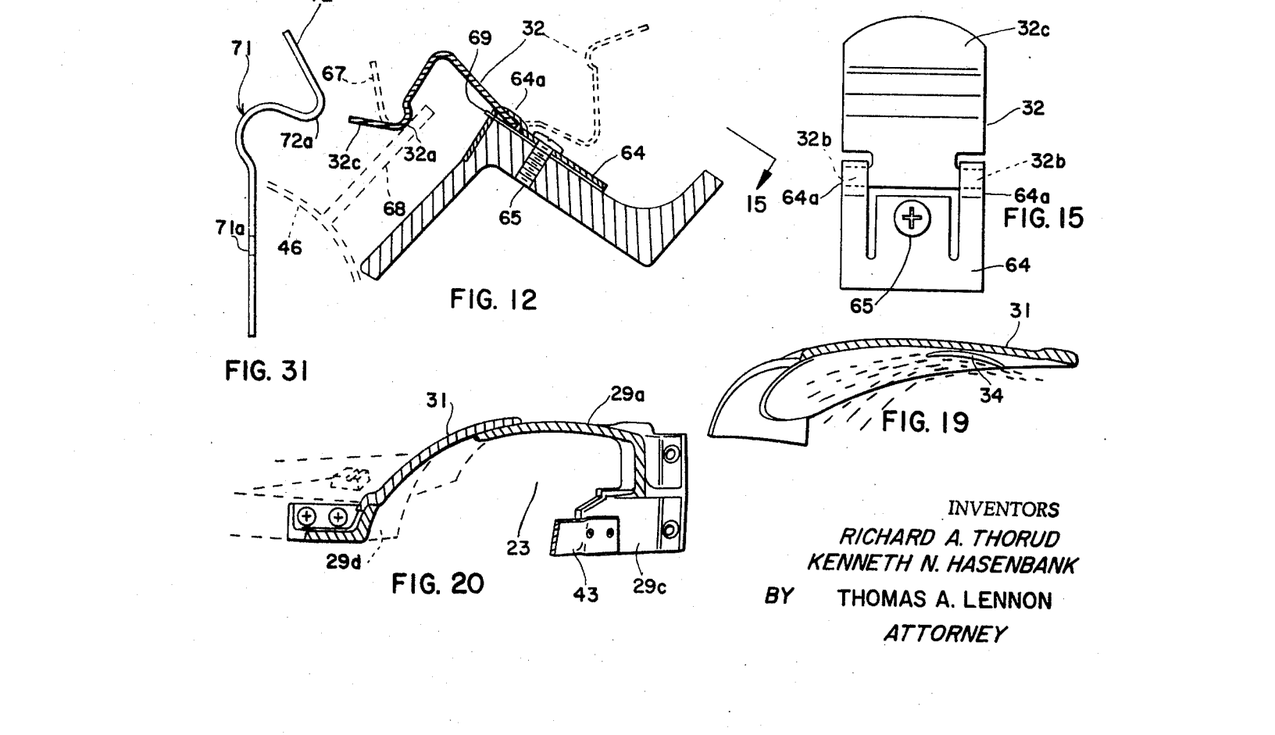
FIG. 12 is a detailed sectional view of the deflector cover clip taken along the lines 12—12 of FIG. 9.
FIG. 19 is a sectionalized perspective view of the deflector interior illustrating the movement of material therethrough.
FIG. 20 is a cross-sectional view of the deflector with the cover closed, as taken approximately along the line 20—20 of FIG. 6.
Figure 13:
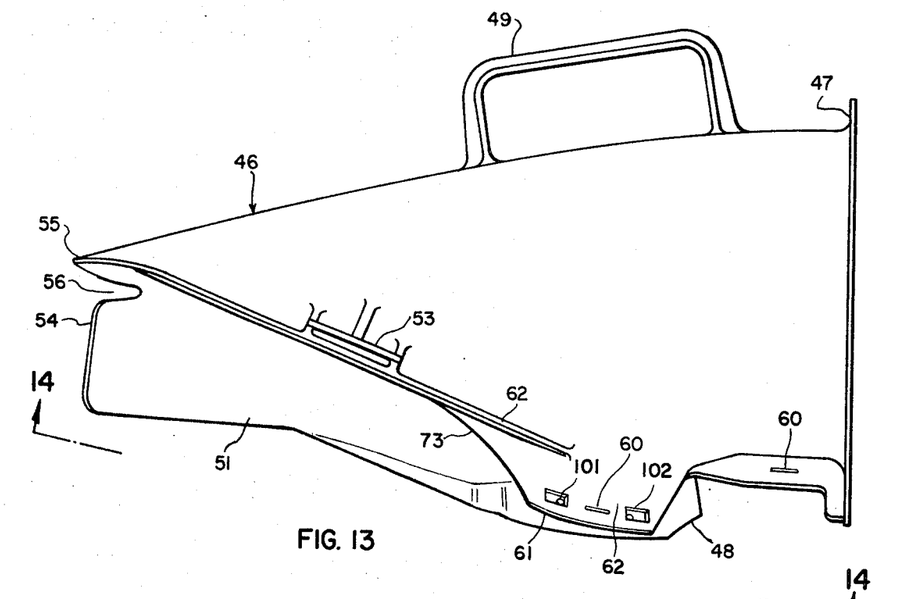
FIG. 13 is a side elevational view on an enlarged scale of a bag chute to be used with the mower and deflector illustrated in FIG. 2.
Figures 14, 34:
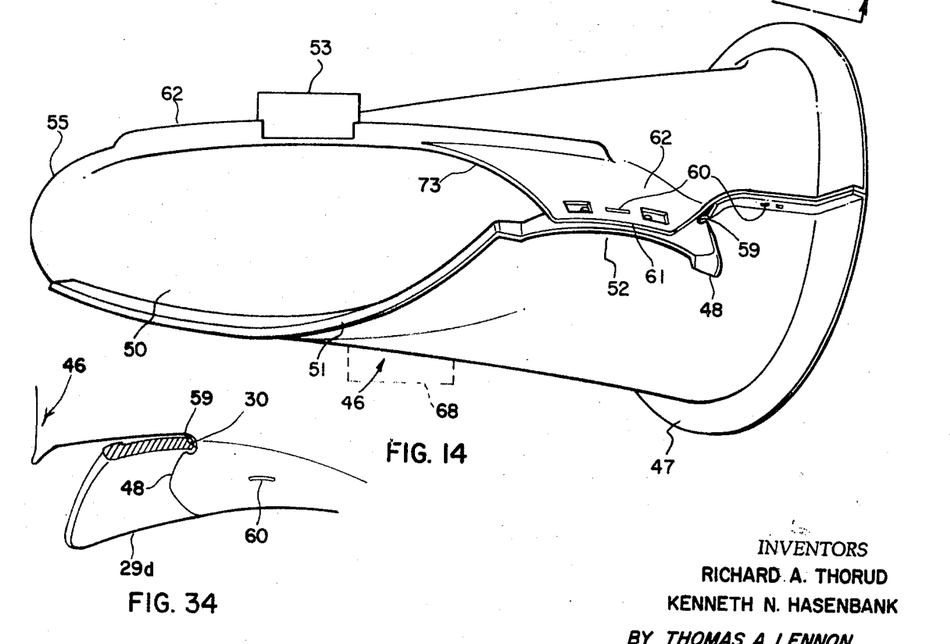
FIG. 14 is a bottom plan view of the bag chute of FIG. 13.
FIG. 34 is a vertical sectional view through the rear portion of the chute when installed on the deflector.
Figure 26:
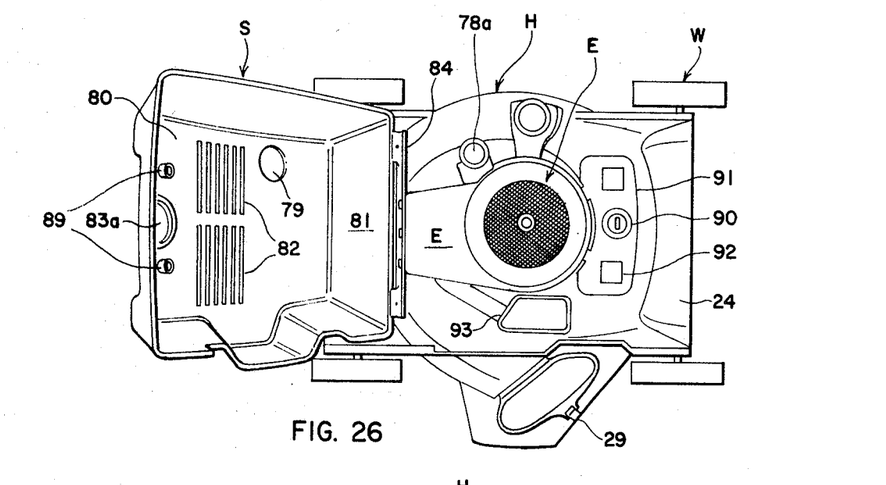
FIG. 26 is a top plan view of the mower of FIG. 1 with the shroud raised.

Variations of the aforedescribed clip which come within the scope of this invention include the forms shown in FIGS. 12 and 31.

In the former, the clip is similar in all respects to clip 32, except for the upper handle portion. In this alternate version, the upper handle 67 thereof is inclined in a direction opposite to 32c, so that when it is in the raised position along with the cover, the handle 67 will be engaged by the descending cover and pushed aside until the cover is closed, whereupon the clip 32 automatically returns (because of its resilient character) to its original position, which, when the cover is closed, results in the clip 32 locking the cover in place.

FIG. 31 illustrates an alternate form of cover clip which clip is identified in its entirety by the numeral 71. The clip 71 has a reverse handle portion 72 the lower bight portion of 72a of which engages the cover 31 and holds same closed in the same manner as clip 32. The clip 71 is formed of a single piece of spring metal and is mounted in the manner as clip 32, namely by a fastener 65 installed in opening 71a and in a manner in which it is always biased towards cover engaging and closing position.

Thus, in the operation of this unit, if the operator does not want to collect the clippings, he makes sure that the bag chute is removed and that the cover is properly seated and locked so that the switch is deactivated and the engine can run. The operator then starts the engine, and proceeds with his cutting, with the clippings being collected in the channel and discharged over the baffle bar through the discharge opening, with all of the clippings and any foreign objects which emerge from the discharge opening striking some part of the deflector assembly and being deflected downwardly onto the ground alongside the mower. If anyone's hand or foot gets below the deflector, it will not engage the blade beacuse of the baffle bar. If the cover is lifted while the motor is running and the blade is turning, the lifting of the cover will activate the switch causing the motor to be immediately shorted out and stopped.

If the operator prefers to collect the clippings, he initially, before starting the mower at all, installs the bag chute in the opening in the deflector after raising the cover, and properly installs the chute therein with the bag thereon, the chute depressing the button of the switch so that the mower can be started. The mower is then started and the operator proceeds with the cutting, all of the material emerging through the discharge opening entering the bag chute and being directed thereby into the bag. When the bag is full, and needs emptying, the operator preferably should shut off the motor from the throttle control up on the panel P. However, if he forgets to do so, as soon as he lifts the handle of the bag chute, the button of the switch is released and the motor is instantaneously shorted out and the blade is stopped.

In the bag and bag chute arrangement illustrated and described, the bag preferably remains attached to the chute even during the bag removal and emptying operation. The rigid, handled bag chute facilitates disengagement from the deflector and emptying of the clippings from the bag.

The lift out bag chute provides an additional safety factor in that should the operator remove the bag from the chute after filling with grass, and finds the chute plugged with grass, he can simply lift out the chute and shake it until the plugged grass falls out. This makes it easier and cleaner for the operator to effect removal of the plugged grass, and reduces the likelihood of his reaching into the chute and accidentally coming into contact with the rotating blade.

The shroud S, best seen in FIGS. 26-29 inclusive includes a top wall 80 and four depending side walls including a rear wall 81. The top wall 80 has a series of slots 82 (sixteen are illustrated) formed therein to permit outside air access to the engine for cooling and operating same. The front portion of the top wall 80 has a well or depression 83 for receiving the cap 90 of the gas tank 91. The shroud is hingedly mounted by means of a v-shaped bracket 84 which is mounted on the rear of the engine by means of screwes 85 which secure the front wall of bracket 84 to the engine. The other leg or wall of the bracket extends rearward and upward at an angle with the front wall thereof and includes a pair of mounting tabs 86 to which is secured complimentary mounting tabs 87 which extend outwardly from the rear wall of the shroud, the tabs 87 being secured to the tabs 86 by means of screws 88, the portion of the shroud mounting tabs between the tabs and the back wall 81 is flexible and provides a hinge 87a for the shroud. The entire shroud is preferably formed of plastic material, the mounting tabs 87 being an integral portion thereof as well as the hinge portion 87a thereof.

The gas tank 91 is mounted on the front of the engine and has the usual fill opening which is normally closed by the aforementioned cap 90.

The gas tank is also provided with a pair of resilient cushions 92 on opposite sides of the cap 90, said cushions being adpated to be engaged by a pair of stop legs 89 which depend from the top wall 80 of the shroud.

Figures 27, 28, 29:
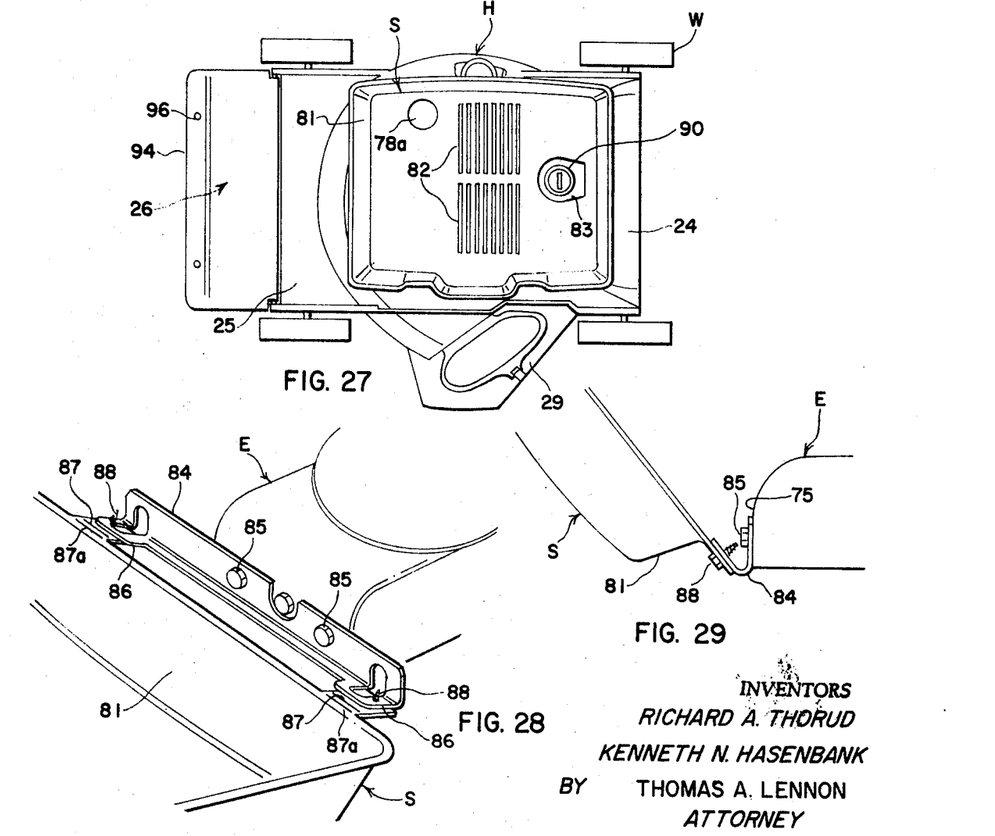
FIG. 27 is a top plan view of the mower of FIG. 26 with the shroud in lowered operative position.
FIG. 28 is an enlarged detailed perspective view of the hinge connection between the shroud and the engine.
FIG. 29 is a side elevational view of FIG. 28.

When the shroud is in the operative position shown in FIG. 27 in which it covers and encloses the engine, it is held firmly in place by the cap 90, which is slightly larger than the opening 83a, so that the cap can engage the portion of the shroud defining said opening 83a and hold the shroud against the tank.

To add gas, the cap may be removed without moving or otherwise interfering with the shroud. The shroud, when in closed operative position, not only conceals the engine, but also the normal engine accessories such as the carburetor and the air pre-cleaner 93.

In the illustrated embodiment, the shroud is provided with an additional opening 79 through which the handle 78a of the pull cord emerges, said pull cord being for the well-known purpose of starting recoil type small engines.

The shroud has a number of advantages. It covers the engine and protects same from dirt, debris, grass clippings, etc. which might tend to clog same and interfere with its proper operation. It also reduces the chances of spilling gas on a hot engine when refilling the tank. Said shroud also substantially muffles engine noise to provide a quieter lawnmower and also adds substantially to the astehtic appearance thereof.

Attention is next directed to the rear safety shield 26 best seen in FIGS. 23-25. The rear safety shield is an elongate piece of metal which is hingedly mounted on the rear of the mower housing with the lower end thereof riding freely on the ground so as to freely follow the ground contours immediately previously traversed by the remainder of the mower so that it is in engagement with the ground at all times. It is of sufficient length or width to substantially span the entire widthwise dimension of the housing and is designed to intercept any and all objects which might be thrown rearwardly from underneath the housing, thereby protecting the operator at all times from thrown objects. In addition, it provides an additional protection for the operator's feet and makes it virtually impossible for the operator's feet to come into contact with the blade under normal circumstances while he is operating the mower while he is standing behind the handle.

This rear safety shield is curved upwardly at the lower end thereof to provide an upwardly and rearwardly extending flange 94 which merges with the curved concave portion 95 which normally engages the ground. The curved portion 95 is provided in addition with a pair of hemispherical plastic buttons 96 which reduce wear on the safety shield and also reduces the amount of noise generated by the shield when it is moved across a hard surface such as a sidewalk or driveway.

The safety shield is also provided with upstanding side walls 97. The shield is attached to the mower in a unique fashion. It will be noted that the housing has integrally formed as a part thereof, a pair rearwardly extending shield mounting portions or bosses 77 which extend rearwardly from the rear deck 25 of teh mower housing. A pin 74 extends through each of said bosses and is threadedly engaged therewith, said pins being encircled and enclosed by the front cylindrically curled portion 98 of the shield, the portion 98 combining with the pins 74 to provide a hinged connection between the safety shield and the mower housing. Plastic bushings 76 are provided on each pin 74 against which bushings engage the curled portion 98 of the shield to silence same.

FIG. 25 illustrates another advantage and safety feature of the rear shield. In FIG. 25, the mower is shown with the shield swung forwardly underneath the rear of the housing with the portion 94 engaging the ground and constituting a barrier which absolutely prevents the operator's feet from entering the interior of the mower housing so long as the shield is in engagement with the ground. The situation illustrated in FIG. 25 occasionally occurs when the operator backs up the mower against his feet, or on accasion when the mower, in moving forwardly, encounters an obstacle and causes it to come to an abrupt halt whereupon the operator's continued pushing causes the rear portion to rise. In so doing, the shield, because of its freely hinged connection to the mower, tends to fold under the mower when the mower returns to the ground and in the interim period of the mower rising and falling, the shield hangs freely in vertical fashion to prevent the operator from being struck by thrown objects when the rear of the mower is in such an elevated condition.

FIG. 30 illustrates the switch cover or boot 66 of FIG. 22 in its natural unstreesed condition or accordion shape prior to its being installed on the switch. The advantage of this formation is that the majority of the time the boot will be in the collapsed condition shown in FIG. 30 rather than in the extended condition of FIG. 22. Since it is naturally formed in the collapsed condition, it is unstressed as such, and therefore, will have a longer life than it would have if it were naturally formed in the extended condition as shown in FIG. 22.

Again referring to FIG. 12, an alternate form of chute structure is shown in which a tab 68 is provided on the chute which extends laterally from the right side as viewed from above and in opposite direction from the switch control tab 53 in this alternate form. The tab 68 is designed to be engaged by the clip 32, or one of the alternate versions thereof discussed herein in the manner illustrated in FIG. 12 so that the clip can serve as a positive hold down device for the chute when it is installed in the deflector.

Figures 35, 36, 37:
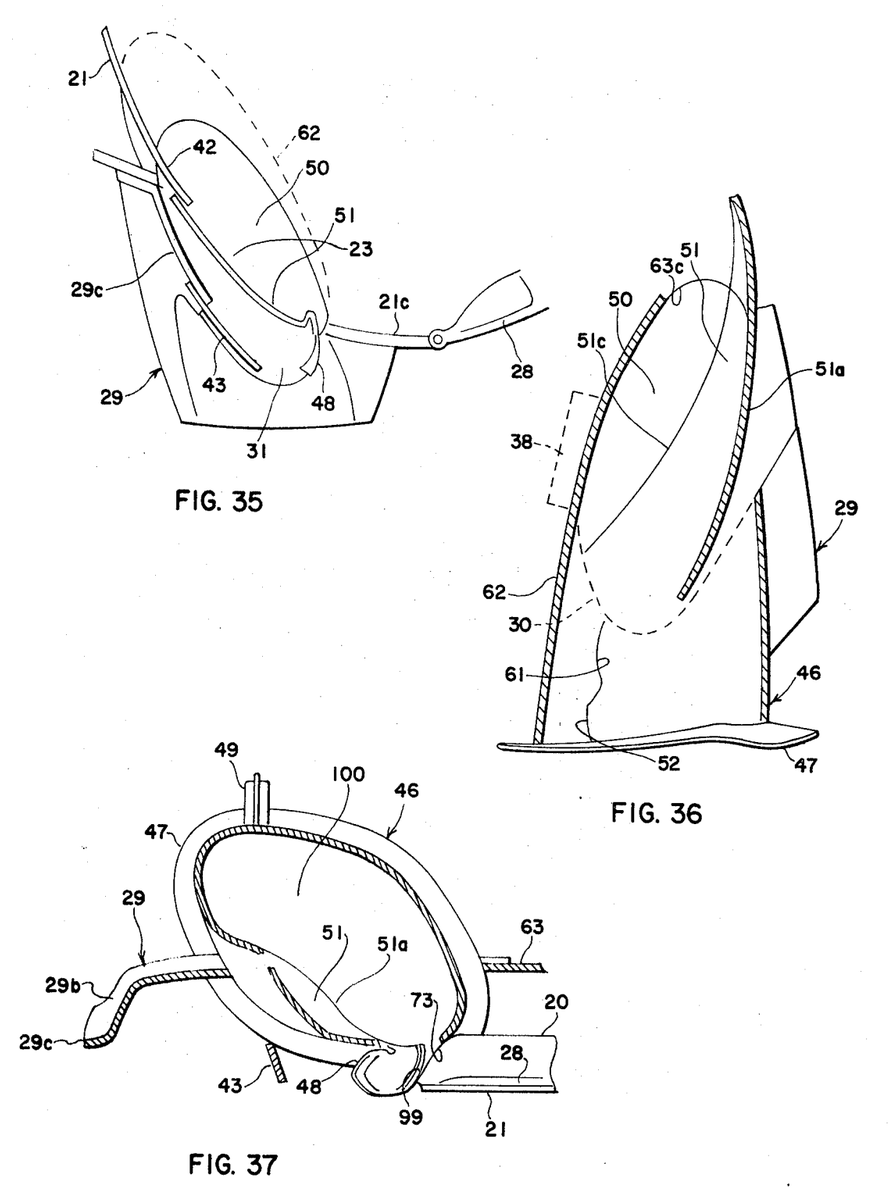
FIG. 35 is a bottom plan view on an enlarged scale of the deflector and a portion of the housing showing the chute installed thereon.
FIG. 36 is a horizontal sectional view through the chute and looking downwardly taken approximately along the line 36—36 of FIG. 2.
FIG. 37 is a vertical cross-sectional view through the chute and deflector taken approximately along the line 37—37 of FIG. 3.

The FIGS. 35-37 inclusive are provided to show the relationship between the chute, housing and deflector when the chute is installed in operative position on the mower.

In FIG. 35, it can be seen that the depending curved wall 51 of the chute extends between the beginning of the outer wall 21c of the channel or tunnel 22 and wall 42 at the discharge view of the tunnel so as to span the entire discharge opening 23 and intercept all clippings emerging from the tunnel thereby causing them to ride up said wall 51 and be discharged through the front operning 50 of the chute with the clippings then passing through the chute into the bag attached thereto.

FIG. 36 views the structure of 35 from above where again it can be readily appreciated how the clipping emerge from the front opening 50 of the chute and pass rearwardly up the inclined ramp provided by the wall 51 of the chute, said opening 50 being defined in part by the lower edge 51c of the wall 51 and in part by the curved wall portion 63c of the housing which also cooperates with the opening 30 in the deflector to provide the basic opening into which the chute is installed.

FIG. 37 shows the chute and the components to which it is attached as viewed from the front in cross-section. The chute has a curved edge portion 73 which rests against a complimentary curved wall portion 99 of the housing to help set the chute properly on the mower. A portion of the inclined wall 51 can again be seen upon which the clippings pass away from the viewer to escape over the rear edge 51a of the wall 51 to be ultimately discharged from the rear opening 100 of the chute.

It will be appreciated from these views that the lower edges of the chute lie in substantially the same plane as the lower edge of the skirt 21c so that the blade, when the chute is installed, is completely enclosed around the full circle of its travel with the only escape from the housing being through the front chute opening 50.

Attention is also directed to the pair of openings 102 in the wall 62 of the chute. These openings each receive a positioning pin 101, the pins being adapted to engage the walls of said openings to hold the walls 62 and 52 against relative longitudinal movement therebetween and help maintain proper position prior to installation of the staples 60.

In FIG. 1 a rear opening bag is illustrated having a flap 103 closing the rear of the bag. Thus, when the bag is to be emptied, the operator can remove the chute by manipulation of its handle from the mower, keeping the bag attached to the chute and by holding the chute and bag vertically with the chute up and unlatch the flap 3. The contents of the bag can be readily emptied into any desired receptacle.

It will, of course, be understood that various changes may be made in the form, details, arrangement and proportions of the various parts without departing from the scope of this invention.

We claim:

1. A turf cutting rotary mower having a rotatable cutting blade, said mower including a housing having a discharge opening therein for discharging clippings therefrom, said opening providing for generally lateral discharge of clippings from said housing, first means supported by said housing for intercepting said clippings and changing the direction thereof, second means supported by said housing for intercepting said clippings after they leave said first means and again changing the direction thereof, said first means including a generally vertical baffle member disposed in the cutting plane of the rotary cutter blade and interposed in the normal path of travel of the discharged material, said baffle member closing off a portion of the discharge opening while leaving a substantial portion thereof remaining above said baffle member for the discharge of clippings over said baffle member through said opening, said second means including a deflector extending generally laterally from said housing and above said discharge opening and in the path of travel of the material discharged from said opening over said baffle whereby said material after passing over said baffle must strike the underside of said deflector and be deflected downwardly onto the ground, said deflector including an opening formed therein for the reception of a bag chute, a bag chute insertable into said opening and adapted to intercept the material discharged through said opening over said baffle and convey same to a collection receptacle, an engine supported by said housing an electrical switch adapted to be movable between two positions, in one of said positions said switch being adapted to prevent further operation of said engine, and in the other position being adapted to permit said engine to run, cover means for said opening in said deflector, said cover means and said bag chute being adapted to engage and actuate said switch, said cover being adapted to engage said switch and move same to engine stopping position when said cover is open and said chute is not installed in said opening, said bag chute being adapted to move said switch to engine running position when properly seated in said opening.

2. A turf cutting rotary mower having a rotatable cutting blade, said mower including a housing having a discharge opening therein for discharging clippings therefrom, said opening providing for generally lateral discharge of clippings from said housing, first means supported by said housing for intercepting said clippings and changing the direction thereof, second means supported by said housing for intercepting said clippings after they leave said first means and again changing the direction thereof, said first means including a generally vertical baffle member disposed in the cutting plane of the rotary cutter blade and interposed in the normal path of travel of the discharged material, said baffle member closing off a portion of the discharge opening while leaving a substantial portion thereof remaining above said baffle member for the discharge of clippings over said baffle member through said opening, a bag chute supported by said housing and having one end portion thereof positioned to receive material ejected from said housing over said baffle member, the other end portion of said chute being adapted to have a receptacle attached thereto and adapted to discharge material passing therethrough into said receptacle, an electrical switch being actuable by said chute means, said switch being adapted for movement between two positions, in one of said positions it stops the motor of the mower and in the other of said positions it permits said motor to run, said bag chute being adapted to cause said switch to move to the motor running position when said chute is installed on said mower in material receiving position, said chute being further adapted to cause said switch to move to motor stopping position when removed from its normal operative position on said mower.

3. A turf cutting rotary mower having a rotatable cutting blade, said mower including a housing for enclosing the cutter blade, said housing having a discharge opening therein for discharging clippings therefrom, said opening providing for generally lateral discharge of clippings from said housing, first means supported by said housing for intercepting said clippings and changing the direction thereof, second means supported by said housing for intercepting said clippings after they leave said first means and again changing the direction thereof, said first means including a generally vertical baffle member disposed in the cutting plane of the rotary cutter blade and interposed in the normal path of travel of the discharged material, said baffle member closing off a portion of the discharge opening while leaving a substantial portion thereof remaining above said baffle member for the discharge of clippings over said baffle member through said opening, said second means including a deflector extending generally laterally from said housing and above said discharge opening and in the path of travel of the material discharged from said opening over said baffle whereby said material after passing over said baffle must strike the underside of said deflector and be deflected downwardly onto the ground, said deflector including an opening formed therein for the reception of a bag chute, a bag chute insertable into said opening and adapted to intercept the material discharged through said opening over said baffle and convey same to a collection receptacle, an engine supported by said housing, an electrical switch adapted to be movable between two positions, in one of said positions said switch being adapted to prevent further operation of said engine, and in the other position being adapted to permit said engine to run, cover means for said opening in said deflector, said cover means and said bag chute being adapted to engage and actuate said switch, said cover being adapted to engage said switch and move same to engine stopping position when said cover is open and said chute is not installed in said opening, said bag chute being adapted to move said switch to engine running position when properly seated in said opening, and said chute including a laterally extending tab with said switch for actuating same.

4. A turf cutting rotary mower having a rotatable cutting blade, said mower including a housing for enclosing the cutter blade, said housing having a discharge opening therein for discharging clippings therefrom, said opening providing for generally lateral discharge of clippings from said housing, first means supported by said housing for intercepting said clippings and changing the direction thereof, second means supported by said housing for intercepting said clippings after they leave said first means and again changing the direction thereof, said first means including a generally vertical baffle member disposed in the cutting plane of the rotary cutter blade and interposed in the normal path of travel of the discharged material, said baffle member closing off a portion of the discharge opening while leaving a substantial portion thereof remaining above said baffle member for the discharge of clippings over said baffle member through said opening, said second means including a deflector extending generally laterally from said housing and above said discharge opening and in the path of travel of the material discharged from said opening over said baffle whereby said material after passing over said baffle must strike the underside of said deflector and be deflected downwardly onto the ground, said deflector including an opening formed therein for the reception of a bag chute, a bag chute insertable into said opening and adapted to intercept the material discharged through said opening over said baffle and convey same to a collection receptacle, said chute including a resilient locking portion, said portion defining with other portions of said chute a locking slot, said slot being adapted to receive at least a portion of said deflector when said chute is seated in said opening in operative position, said locking portion engaging said deflector when said deflector is seated in said slot and resiliently holding said chute in engagement with said deflector.

5. A turf cutting rotary mower having a rotatable cutting blade, said mower including a housing for enclosing the cutter blade, said housing having a discharge opening therein for discharging clippings therefrom, said opening providing for generally lateral discharge of clippings from said housing, first means supported by said housing for intercepting said clippings and changing the direction thereof, second means supported by said housing for intercepting said clippings after they leave said first means and again changing the direction thereof, said first means including a generally vertical baffle member disposed in the cutting plane of the rotary cutter blade and interposed in the normal path of travel of the discharged material, said baffle member closing off a portion of the discharge opening while leaving a substantial portion thereof remaining above said baffle member for the discharge of clippings over said baffle member through said opening, said second means including a deflector extending generally laterally from said housing and above said discharge opening and in the path of travel of the material discharged from said opening over said baffle whereby said material after passing over said baffle must strike the underside of said deflector and be deflected downwardly onto the ground, said deflector including an opening formed therein for the reception of a bag chute, a bag chute insertable into said opening and adapted to intercept the material discharged through said opening over said baffle and convey same to a collection receptacle, said mower housing and said deflector defining a chamber, said chute having a retaining portion insertable in said chamber when said chute is seated in said opening to hold said chute in operating position on said deflector.

* * * * *